Sept. 2, 1958     M. J. GARDINER     2,849,827
FISHING FLOAT
Filed July 31, 1956
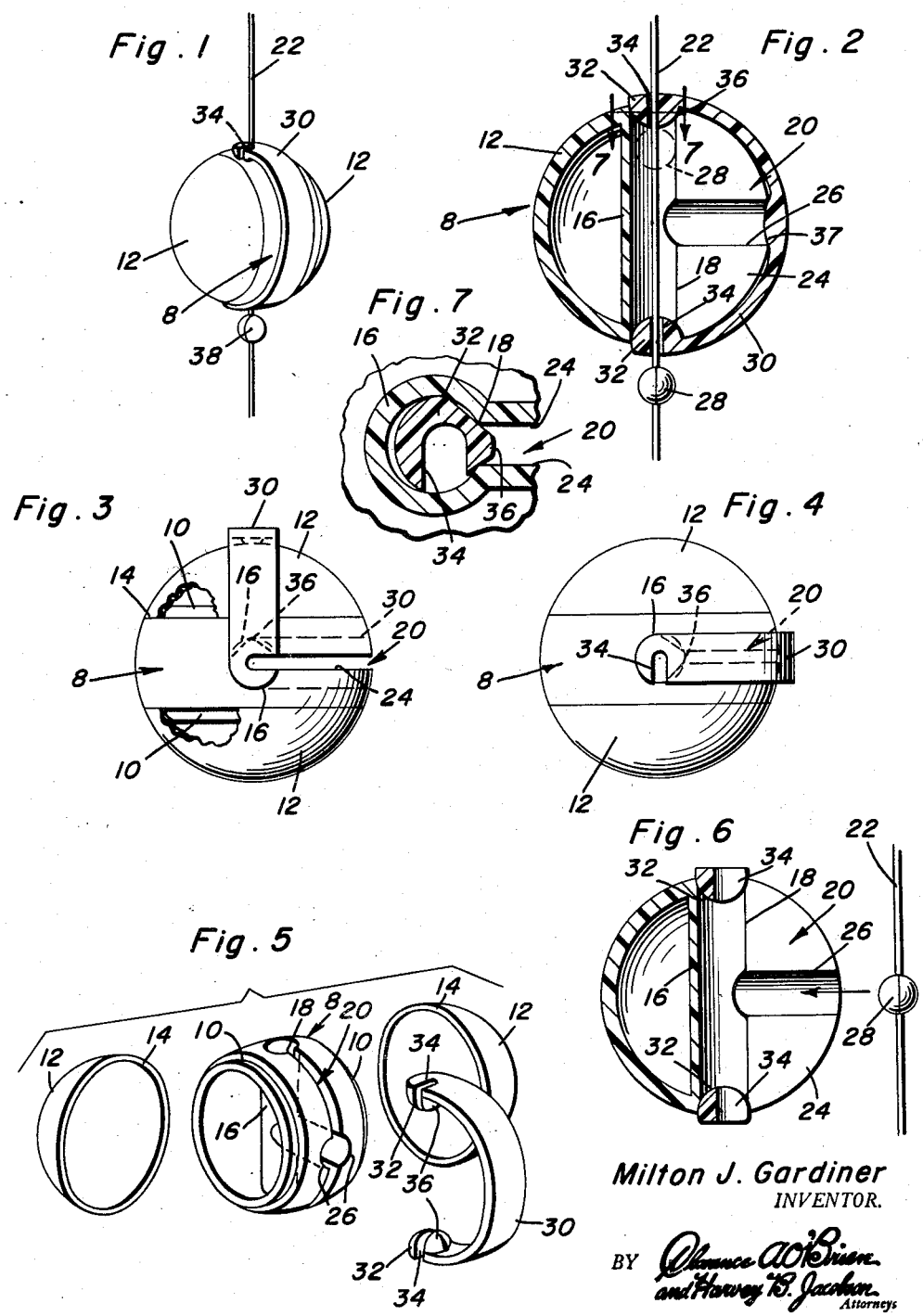
Milton J. Gardiner
INVENTOR.

United States Patent Office 2,849,827
Patented Sept. 2, 1958

2,849,827

FISHING FLOAT

Milton J. Gardiner, South Gate, Calif.

Application July 31, 1956, Serial No. 601,290

5 Claims. (Cl. 43—44.9)

The present invention relates to an improved fishing float which is readily attachable to and detachable from a fishing line and, for such reasons, has an axial line receiving passage opening through its top and bottom portions, a radial slot which is communicable therewith and opens through one side of the float, and wherein means of a manually actuatable type is provided on the float to retain it on the line.

It will be evident from the foregoing that floats having these characteristics are old and well known. It is an object of the invention, therefore, to structurally, functionally and otherwise improve upon similarly constructed and performing quick-attachable floats, and, in so doing, to provide a novel adaptation which is simple, practical, easy-to-handle and use and otherwise such that it will fulfill the purposes for which it is intended.

Briefly, the preferred embodiment of the invention has to do with a float constructed as already described and wherein a yoke, which serves as a handle, is provided at its ends with specially designed embossments which function as plugs and are plugged for rotation into the respective end portions of the aforementioned passage and are provided with lateral kerfs, said kerfs serving as keeper seats for the line, and being turnable, by way of the yoke or handle, to predetermined positions to thus attach the float to the line, or to alternate positions, when they line up with the slot and thus permit the easy application and removal of the float.

Other objects, features and advantages will become more readily apparent from the following description and the accompanying sheet of illustrative, but not restrictive drawings.

In the drawings:

Fig. 1 is a perspective view of the improved attachable and detectable float attached to the line for use;

Fig. 2 is a view in section on a slightly enlarged scale showing, in dotted lines, a feature to be later described;

Fig. 3 is a plan view with portions broken away and showing the yoke to the left with the keeper notches in their open positions, that is aligned with the line inserting and removing slot;

Fig. 4 is a view like Fig. 3 with the yoke in its normal position, the position assumed when it is in use;

Fig. 5 is an exploded perspective view;

Fig. 6 is a sectional view similar to Fig. 2 with the yoke in the position seen in Fig. 3 and the keeper notches open with the line about to be inserted; and Fig. 7 is an exaggerated view on the horizontal line 7—7 of Fig. 2.

The float, as already intimated, need not necessarily be of the composite construction depicted in the drawings. Actually, any buoyant body with an axial passage and slot, either spherical, elongate or some other construction and design would do. By preference, however, the float is preferably of the triple part plastic construction seen in Fig. 5 wherein it will be observed that the central or body portion is substantially annular in form and denoted by the numeral 8. The reduced ledge-like extensions 10 on opposite ends or sides serve to accommodate the semi-spherical shells 12. That is to say, the edge portions 14 overlap and are mounted on the endless flanges or ledges 10 as shown in Fig. 3 and are fastened in any suitable manner (not detailed). The central axial passage is here in the form of an integral vertical tube 16, the upper and lower ends of which are open and side portion 18 of which may be said to be slotted with the slot communicating with the sector-shaped entrance and exit slot 20. The latter extends from its inner end at the left in Fig. 5 through the peripheral side or surface to allow the float to be applied to or removed from the fishing line 22 in the somewhat obvious manner seen in Fig. 6. It will be noted that this slot 20 is narrower than the cross-section of the passage formed by the tube 16. It will be further noticed that the median portions of the opposed flat walls which define the slot, that is the walls 24, are molded or formed with semicircular grooves or channels 26 which together form a right angular passage. This passage is of a diameter to accommodate the bead 28. The latter may be a well known split-type buckshot of suitable size in which, when it is in the full line position seen in Fig. 2, provides a stop or shoulder inwardly of the baited end (not shown) of the fishing line. That is to say, this is a shoulder which facilitates casting the line with the float thereon when it is in the position seen in Figs. 1 and 2. When in this Fig. 2 position the float is free to slide on the line or, vice versa, the line is free to slide through the float when the float lands on the water.

In order to latch and retain the float on the fishing line simple fastening devices are provided. More specifically, the means comprises a substantially U-shaped or arcuate plastic yoke 30 having embossed free end portions. The bosses are fashioned or shaped to provide projections which project towards each other in axial alignment and which are defined as plugs. These plugs 32 are plugged into the upper and lower ends of the passage 16 and are rotatable angularly therein as is evident from the drawings. This is done by flipping or switching the handle 30 from the position seen in Fig. 3 to that seen in Fig. 4 or vice versa. The plugs have kerfs therein and the kerfs are conveniently referred to as keeper seats or notches and they are denoted at 34. They open through the left hand edge of the yoke as seen in Fig. 5 and they are registrable with the slot 20 and "open" when in the position seen in Fig. 3 and are disaligned and swing into the encompassing limits of the pasasge 16 when they are closed as seen in Fig. 4. It will be further noted that each plug is provided peripherally with a lug-like projection which is here referred to as a detent 36 as seen in Fig. 7. Hence when the handle or yoke is in the Fig. 4 position the detents snap into the slot and the slot serves to thus hold the yoke and plugs in this closed line retaining position. Assuming that the device is fastened on the line as shown in Fig. 1, the buckshot or stop element will be below the float and hence the cast may be made as usual and the forward ride of the float will be limited by the element 28. This provides a free running float. It will be free to move up and down the line from the split-shot while casting and to the surface of the water after casting. With a wind blowing, the float will ascend the line toward the fisherman instead of floating the line in, as securely attached floats do. When a fish is hooked the float cannot be pulled under water where the fish can get his weight against it to pull the hook from his mouth.

It is permissible as seen in Fig. 6 to attach the buckshot 28 to the line and to pass it through the groove 26 so that it will take the dotted line position seen in Fig. 2 afer which it will be latched in place and thus the float will be attached to the line so that the line does not slide freely therethrough.

Reverting to the manually applicable and releasable detents 36 it is to be pointed out that it is within the purview of the invention to provide an added detent such as at 37 which detent is on the intermediate portion of the inner surface of the yoke, and which functions simultaneously with the detents 36 and also snaps into the cooperating portion of the slot 20 to assist in retaining the yoke in the slot-covering position seen in Fig. 4. It will be clear too that several detents may be utilized in the manner disclosed in the drawings or that the endmost detents 36 may be dispensed with and the central detent 37 may be relied upon to achieve the latching and retaining function of the yoke.

Although models of the invention which have been made have utilized the three part float construction seen in Fig. 5, it is evident that the float may be made up of half-sections suitably joined together or that the annular body portion 8 itself may be of sectional construction.

It is to be mentioned that a novel aspect of the invention not touched upon is the fact that the slot 20, the grooves 26 and hollow portion of the vertical tube 16 may be utilized as a "pocket" for reception of buckshot (one or more) with the latter serving to add weight if the latter is deemed to be necessary or advisable in using the invention. By having weight the casting step is effectuated with greater expediency.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fishing line float comprising a buoyant body having a cylindrical axial passage therethrough for reception and retention of a fishing line, also having a narrow radial line inserting and removing slot, median portions of the walls of said slot being provided with opposed grooves forming a second passage at right angles to said first named passage and communicating said first-named passage with one side of said body, plugs telescoping into the respective upper and lower ends of said first passage and rotatable in said first passage, said plugs having line accommodating kerfs providing keeper seats which may be aligned and registered with said slot which at attaching and detaching the body or alternatively turned to positions out of register with said slot for attachment of the body to the line, said keeper seats serving to permit free passage of the line, and a rigid yoke conformable in shape with and embracing a cooperating exterior surface portion of said body and having its end portions connected with said plugs and serving as a turning handle for the plugs, as a cover for said slot and for simultaneously aligning or misaligning said keeper seats with said slot, a fishing line, a weight of requisite size and shape attached securely to the line in a manner to pass through said second passage into the cylindrical axial passage thereby making said buoyant body stationary on the line, and said yoke having a detent on that side thereof adjacent to the cooperating surface of the body, said detent being positioned to snap retentively into the outer end of the second passage so that the yoke is temporarily held in its slot-covering and second-passage-closing position.

2. A fishing line float comprising a buoyant body having an axial passage extending through the body for reception and retention of a fishing line, also having a narrow radial line inserting and removing slot communicating said passage with one side of said body, each wall of said slot having a central semi-circular groove forming a right angular bore, radiating from said passage through one side of said float, plus telescoping into the respective upper and lower ends of said passage and rotatable in said passage, said plugs having line accommodating kerfs providing keeper seats which may be aligned and registered with said slot while attaching and detaching the body or alternatively turned to positions out of register with said slot for attachment of the body to the line, said keeper seats providing free passage of the line, and a yoke connecting said plugs to each other and serving as a turning handle for the plugs and for simultaneous opening and closing of said keeper seats, each plug having a radial detent adapted to project into and be lodged internally in said slot for retention or rotated away from the slot and released, at which time the keeper seats are then in registration with said slot.

3. A fishing line float comprising a buoyant body having a passage extending axially through said body and adapted for reception and retention of a fishing line, said body also having a radial fishing line inserting and removing slot communicating with and radiating from said passage and opening through one side of said body, plugs telescoping rotatably into and substantially closing the respective upper and lower ends of said passage and having line accommodating kerfs providing keeper seats which are adapted and may be aligned and registered with said slot while one is attaching the body to the line or detaching the body from the line, or, alternatively, turned to positions out of communicative registration with said slot after the body has been attached to the line, a yoke connecting said plugs to each other and serving as a turning handle for the plugs and also for opening and closing said keeper seats relative to said slot and passage, each plug having a radial detent which may be projected into and lodged in said slot for retention or rotated away from the slot and released, at which time said keeper seats are in registration with said slot, said passage being of a cross section greater than the width of said slot, and the walls of said slot being in adjacent parallelism and being provided in their median portions with opposed parallel grooves cooperating and defining a second passage at right angles to the first passage and opening at its inner end into the first passage and opening at its outer end through the median portion of said slot, said second passage serving to permit a ball-like weight which is provided on said line to be passed through the second passage and then positioned in the first passage for retention, in part, by the plugs at the upper and lower ends of said first passage.

4. The structure defined in claim 3 and wherein said yoke is conformable in shape and contour to operate in close proximity relative to the cooperating surface of the body, said yoke being wider than the slot in order to fully close the slot when the handle is in alignment with the slot, the intermediate portion of said yoke being provided with a detent which may be releasably engaged with the entrance of said second passage in a manner to securely maintain the yoke in a predetermined position relative to the slot, whereby the yoke serves not only as a handle but also to cover and close the slot and in addition stays in a given closing position.

5. A float for a fishing line having a ball-like weight secured thereto comprising a buoyant body having a passage extending axially through said body and adapted for reception and retention of a fishing line, said body also having a radial fishing line inserting and removing slot communicating with and radiating from said passage and opening through one side of said body, plugs telescoping rotatably into and substantially closing the respective upper and lower ends of said passage and having line accommodating kerfs providing keeper seats which are adapted and may be aligned and registered with said slot while one is attaching the body to the line or detaching the body from the line or, alternatively, turned to positions out of communicative registration with said slot after the body has been attached to the line, a yoke connecting said plugs to each other and serving as a turning handle for the plugs and also for aligning and misaligning said keeper seats relative to said slot, said passage being of a cross section greater than the width of said slot, and the walls of said slot being in adjacent parallelism and being provided in their median portions with opposed parallel grooves cooperating and defining a second passage at right angles to the first passage and opening at its inner end into the first passage and opening at its outer end through the median portion of said slot, said second passage serving to permit said ball-like weight which is provided on said line to be passed through the second passage and then positioned in the first passage for retention, in part, by the plugs at the upper and lower ends of said first passage, said yoke being conformable to the exterior shape and contour of said body and being swingable freely relative to the exterior surface and in proximity to said surface, said yoke being of a width greater than the width of the slot so that it serves to fully close the slot when the handle is in alignment with the slot, an intermediate portion of the yoke on the interior side of the yoke adjacent the surface of the body being provided with a detent which may be releasably snapped and engaged with entrance end of said second passage in a manner to securely maintain the yoke in the aforementioned slot-closing position, and said yoke constituting a handle for simultaneously operating said plugs and moving said keeper seats to predetermined aligned or misaligned position with respect to said slot.

References Cited in the file of this patent

UNITED STATES PATENTS

| | | |
|---|---|---|
| 522,167 | Rawlings | June 26, 1894 |
| 1,380,244 | Otis | May 31, 1921 |
| 1,652,858 | Hahn | Dec. 13, 1927 |
| 2,579,713 | Tolle | Dec. 25, 1951 |